(12) United States Patent
Levin (10) Patent No.: US 12,479,459 B2
(45) Date of Patent: Nov. 25, 2025

(54) METHOD FOR OPERATING AN ELECTRIC VEHICLE, DATA PROCESSING SYSTEM, ELECTRIC VEHICLE, COMPUTER PROGRAM PRODUCT AND COMPUTER-READABLE MEDIUM

(71) Applicant: Volvo Car Corporation, Gothenburg (SE)

(72) Inventor: Daniel Levin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 353 days.

(21) Appl. No.: 18/075,507

(22) Filed: Dec. 6, 2022

(65) Prior Publication Data

US 2023/0174095 A1    Jun. 8, 2023

(30) Foreign Application Priority Data

Dec. 7, 2021   (EP) ..................................... 21212930

(51) Int. Cl.
*B60W 50/16*       (2020.01)
*B60W 30/18*       (2012.01)
(Continued)

(52) U.S. Cl.
CPC ...... *B60W 50/16* (2013.01); *B60W 30/18127* (2013.01); *B60W 40/08* (2013.01);
(Continued)

(58) Field of Classification Search
CPC . B60W 50/16; B60W 30/18127; B60W 40/08
See application file for complete search history.

(56) References Cited

U.S. PATENT DOCUMENTS 10,246,095 B2 *   4/2019   Lee .......................... B60T 1/10
11,897,366 B2 *   2/2024   Rotilli Filho ... B60W 30/18172
(Continued)

FOREIGN PATENT DOCUMENTS

EP         2 332 795 A1      6/2011

OTHER PUBLICATIONS

May 20, 2022 European Search Report issued in corresponding EP Application No. 21 21 2930.

*Primary Examiner* — Luke Huynh
(74) *Attorney, Agent, or Firm* — Clements Bernard Walker; Christopher L. Bernard (57) ABSTRACT

A method for operating an electric vehicle. The method includes receiving an information about an upcoming speed reduction (S1) and determining a release position or a release time at which a drive pedal of the electric vehicle is to be released, such that at a position corresponding to the speed reduction the electric vehicle travels at a speed corresponding to the speed reduction (S2). Moreover, a first notification position is determined for providing a first notification signal concerning the release of the drive pedal (S3). Alternatively or additionally a first notification time is determined for providing a first notification signal concerning the release of the drive pedal (S3). Furthermore, a data processing system is presented. including data processing means for carrying out the above method. Additionally, an electric vehicle including such a data processing system is explained. Also, a corresponding computer program product and a corresponding computer-readable medium are shown.

13 Claims, 4 Drawing Sheets

(51) Int. Cl.
*B60W 40/08* (2012.01)
*B60W 50/14* (2020.01)
(52) U.S. Cl.
CPC . *B60W 2050/143* (2013.01); *B60W 2050/146* (2013.01); *B60W 2540/10* (2013.01)

(56) References Cited

U.S. PATENT DOCUMENTS

| | | |
|---|---|---|
| 2002/0105423 A1 | 8/2002 | Rast |
| 2012/0078496 A1 | 3/2012 | Linphuber et al. |
| 2017/0015202 A1* | 1/2017 | Bryan .................... B60K 6/445 |
| 2018/0297613 A1 | 10/2018 | Moia et al. |
| 2020/0031370 A1 | 1/2020 | Soliman |

* cited by examiner

METHOD FOR OPERATING AN ELECTRIC VEHICLE, DATA PROCESSING SYSTEM, ELECTRIC VEHICLE, COMPUTER PROGRAM PRODUCT AND COMPUTER-READABLE MEDIUM

CROSS-REFERENCE TO RELATED APPLICATION

The present disclosure claims the benefit of priority of co-pending European Patent Application No. 21 212 930.8, filed on Dec. 7, 2021, and entitled "METHOD FOR OPERATING AN ELECTRIC VEHICLE, COMPUTER PROGRAM PRODUCT AND COMPUTER-READABLE MEDIUM," the contents of which are incorporated in full by reference herein.

TECHNICAL FIELD

The present disclosure relates to a method for operating an electric vehicle. Moreover, the present disclosure is directed to a data processing system including data processing means for carrying out such a method. Additionally, the disclosure is directed to an electric vehicle including such a data processing system. Furthermore, the disclosure relates to a computer program product and a computer-readable medium.

BACKGROUND

Electric vehicles usually include a drive pedal and a brake pedal by which a human driver can operate the electric vehicle, i.e. request a certain amount of acceleration or deceleration. The drive pedal in some aspects corresponds to the accelerator pedal known from vehicles using a combustion engine. However, the functionality of a drive pedal is usually enhanced in that in a situation in which the drive pedal is released, the electric vehicle is operated in an energy regeneration mode in which the kinetic energy of the electric vehicle is used for regenerating a traction battery thereof. This means that in such a situation the kinetic energy is transformed into electric energy being fed into the traction battery, i.e. the traction battery is charged. This is often called regenerative braking even though the brakes of the vehicles are not used.

It is obvious that the regeneration of energy increases the electric driving range and therefore reduces the number of stops that are necessary for charging the electric vehicle from a grid.

BRIEF SUMMARY

It is, thus, an objective of the present disclosure to further foster the regeneration of energy, i.e. the use of regenerative braking. The problem is at least partially solved or alleviated by the subject matter of the present disclosure.

According to a first aspect, there is provided a method for operating an electric vehicle, including:
receiving an information about an upcoming speed reduction, the upcoming speed reduction being described by a speed objective parameter and a position parameter,
determining a release position or a release time at which a drive pedal of the electric vehicle is to be released, such that at a position being described by the position parameter the electric vehicle travels at a speed corresponding to the speed objective parameter, and one or more of:
determining a first notification position for providing a first notification signal, the first notification signal concerning the release of the drive pedal, and a difference between the first notification position and the release position being greater than a travel distance of the vehicle corresponding to a driver reaction time, and
determining a first notification time for providing a first notification signal, the first notification signal concerning the release of the drive pedal, and a difference between the first notification time and the release time being greater than a driver reaction time.

An upcoming speed reduction may be due to the fact that the electric vehicle is approaching at least one of an intersection, a roundabout, an exit, a turn, a lower speed limit zone, and a slower moving vehicle. Obviously, a speed reduction can only be the case if a speed described by the speed objective parameter of the speed reduction is smaller than a current speed of the electric vehicle.

The position parameter by which the upcoming speed reduction is characterized can be a position parameter within a global reference system. However, it is also possible that the position parameter describes a position relative to the electric vehicle which uses the method according to the disclosure. It is noted that only the latter is suitable if the upcoming speed reduction does not have a globally fixed position, e.g. if the upcoming speed reduction is a slower moving vehicle.

In the present context it is understood that upon release of the drive pedal, the electric vehicle enters an energy regeneration mode, i.e. the electric vehicle performs regenerative breaking. As a consequence thereof, the electric vehicle decelerates.

Moreover, the designation of the notification position as a first notification position, the designation of the notification signal as a first notification signal and the designation of the notification time as a first notification time is done for the ease of explanation only. A number of notification positions, notification signals and/or notification times is not implied.

The general idea underlying the present disclosure, thus, is directed to providing a notification position or notification time such that a driver of the electric vehicle can be informed about the fact that he/she should release the drive pedal. Additionally, a reaction time of the driver of the electric vehicle is considered. The method provides the notification position and/or the notification time such that the driver can be informed about a beneficial release of the drive pedal well in advance of the time and/or position at which he/she would need to effectively release the pedal. Consequently the driver has the opportunity to mentally and/or physically prepare for releasing the drive pedal and therefore will be able to release the drive pedal at a good time and/or a good position such that energy regeneration is maximized. This means that he/she will not release the drive pedal too early and will not release the drive pedal too late. If the drive pedal is released too early, an intermediate acceleration will be necessary before reaching the upcoming speed reduction. This is disadvantageous for a driving range of the electric vehicle. If the drive pedal is released too late, energy regeneration potential is wasted since then the mechanical brakes will need to be engaged additionally in order to reach the upcoming speed reduction with a speed corresponding to the speed objective parameter.

The first notification position can thus be called a pre-alert position and the first notification time can be called a pre-alert time since the first notification position and the first notification time occur before the position and/or time when the drive pedal actually needs to be released.

Using the method according to the present disclosure, thus, increases the use of the regeneration potential and consequently leads to an increased driving range of the electric vehicle.

For the present method, the reaction time of the driver can be assumed to be constant. The corresponding reaction distance can be calculated if the travel speed of the vehicle is known. A very short reaction time is 0.2 to 0.3 seconds. Depending on the condition of the driver, e.g. fatigue, the reaction time can also be longer.

In an example, the method may include determining a second notification position for providing a second notification signal. Also the second notification signal concerns the release of the drive pedal. In contrast to the first notification position, a difference between the second notification position and the release position equals a travel distance of the vehicle corresponding to a driver reaction time. Alternatively or additionally, the method may include determining a second notification time for providing a second notification signal. Also the second notification signal concerns the release of the drive pedal. In contrast to the first notification time, a difference between the second notification time and the release time equals a driver reaction time. Said otherwise, the second notification position and the second notification time designate the time or position at which the driver ultimately needs to be told to release the drive pedal in order to still be able to release the drive pedal at the correct position and/or at the correct time for maximizing the use of the regeneration potential. As has already been explained before, the first notification position can be designated a pre-alert position and the first notification time can be called a pre-alert time. Consequently, the second notification position can be designated a main-alert position and the second notification time can be designated a main-alert time. The alert, thus, includes two stages. For this reason, the release of the drive pedal at the most beneficial time or at the most beneficial position is facilitated.

In an example, the method includes determining an intermediate notification position for providing an intermediate notification signal. Also the intermediate notification signal concerns the release of the drive pedal. The intermediate notification position is located between the first notification position and the second notification position. Alternatively or additionally, the method includes determining an intermediate notification time for providing an intermediate notification signal. The intermediate notification signal concerns the release of the drive pedal. The intermediate notification time lies between the first notification time and the second notification time. In both alternatives, a three stage alert can be provided to the driver, wherein the first notification position and/or the first notification time may be used for generating a first stage alert or pre-alert. The second notification position and/or the second notification time may be used for generating a third stage alert or main-alert. The intermediate notification position and/or the intermediate notification time may be used for generating a second stage alert. The second stage alert may also be designated as second pre-alert, second stage pre-alert or intermediate alert. The release of the drive pedal at the most beneficial position and/or time is thus further facilitated.

In an example, the first notification signal is provided if the first notification position and/or the first notification time is reached. Alternatively or additionally, the second notification signal is provided if the second notification position and/or the second notification time is reached. Alternatively or additionally, the intermediate notification signal is provided if the intermediate notification position and/or the intermediate notification time is reached. Thus, the respective notification signals are always provided at the desired position and/or time.

In an example, the first notification signal, the intermediate notification signal and the second notification signal form a countdown signal pattern. A countdown signal pattern is understood as a signal pattern having at least one parameter which is changing as a function of the proximity of a target state. In the present method the target state may be the second notification position and/or the second notification time. The changing parameter is for example an intensity or a frequency of the signal. Of course any other parameter may also be used for the same objective. Due to such a countdown signal pattern the driver is very well informed about the position and/or the time at which he/she needs to release the drive pedal in order to maximize the use of the regeneration potential.

Since signals are either determined based on a position or on a time, the countdown is a time-countdown or a distance-countdown.

In an example, at least one of the first notification signal, the second notification signal and the intermediate notification signal is at least one of an acoustic signal, a visual signal, and a haptic signal. Such signals can be reliably perceived by a driver of the electric vehicle without causing distraction from the actual driving activity. All of these signals can easily be configured such that they form a countdown signal pattern. An example of an acoustic signal is a beep sound pulse. If such a signal is configured as a countdown signal pattern, a frequency of the beep sound pulses can be increased if the notification position and/or the notification time is approaching. In another example, the acoustic signal includes a voice signal. In this example, the countdown can be realized by the voice effectively counting down. A visual signal can for example be displayed on a screen or a head-up display within the electric vehicle. If it is configured as a countdown signal pattern, it can, of course consist in showing a sequence of decreasing numbers, i.e. 5-4-3-2-1. However, it is also possible to show an increasing or decreasing bar or to show a decreasing or increasing number of graphic elements, e.g. bars. A haptic signal can be realized as a vibration or a temporarily increased resistance of the drive pedal. If such a signal is configured as a countdown signal pattern, the frequency of vibration occurrences and/or an intensity of the vibration may change.

Of course, a combination of different signals is also possible.

In an example, at least one of the first notification signal, the second notification signal and the intermediate notification signal is provided to a driver of the electric vehicle. Consequently, the driver is informed about the fact that he/she should release the drive pedal. If a first notification signal and/or an intermediate signal are used, the driver is even informed before he/she actually needs to release the drive pedal and thus has the opportunity to physically and mentally prepare thereto.

In an example, the method includes receiving the information about the upcoming speed reduction from a map available in the electric vehicle. Such a map may contain information about at least one of an intersection, a roundabout, an exit, a turn and a lower speed limit zone. In this context, the map may be provided by a navigation system. However, it is also possible that the map is provided without a navigation functionality, i.e. without the functionality for navigating the vehicle through an environment being represented by the map.

According to an example, the method includes receiving the information about the upcoming speed reduction from a visual inspection unit of the electric vehicle. Such a visual inspection unit may be formed as a camera unit including at least one camera. Alternatively or additionally, the visual inspection unit may include a radar unit and/or a lidar unit. The visual inspection unit may be configured for detecting at least one of an intersection, a roundabout, an exit, a turn, and a slower moving vehicle. In connection with the example of a slower moving vehicle, it can be useful to use a visual inspection unit including a radar unit and/or a lidar unit. The detection by the visual inspection unit can be done by analyzing images captured thereby. In this context, an image is to be understood in the broad sense such that it covers not only optical images, but also radar detection results and lidar detection results. A lower speed limit zone may be detected by the visual inspection unit if the visual inspection unit is configured for detecting road signs. Consequently, the detection of an upcoming speed reduction is quick and reliable.

In an example, the method includes determining the release position or the release time based on a vehicle-specific deceleration function using a current speed as an input parameter and/or based on a look-up table showing a vehicle-specific deceleration as a function of a current speed. Thus the vehicle-specific deceleration function and the look-up table both contain information on how far and/or how long a vehicle will travel once the drive pedal is released. This information is provided in dependency from a current speed of the electric vehicle. In the present disclosure, the deceleration function and the look-up table are used for determining the release position or the release time. This can be done in a simple and reliable manner.

In a case in which an electric vehicle can be operated according to different driving modes having different deceleration characteristics, e.g. a so-called one pedal driving mode or an eco mode, of course, different deceleration functions and different look-up tables may be used depending on the selected driving mode.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

According to a second aspect there is provided a data processing system including a data processing means for carrying out the method according to the present disclosure. Such a data processing system may have an input interface for receiving the information about the upcoming speed reduction. Such an input interface is for example configured for being communicatively connected to a navigation system and/or a visual inspection unit of the electric vehicle. Moreover, the data processing system may have an output interface for outputting at least one of a first notification position, a first notification time, a second notification position, a second notification time, an intermediate notification position and an intermediate notification time. Consequently, a driver can be informed about the fact that the drive pedal shall be released.

In an example, the data processing system may include a signal generation means being configured for providing at least one of the first notification signal, the second notification signal, and the intermediate notification signal. The first notification signal, the second notification signal, and the intermediate notification signal are at least one of an acoustic signal, a visual signal, and a haptic signal. The signals can for example be provided to a driver. Consequently, the driver can release the drive pedal at an appropriate position or at an appropriate time. Therefore an energy regeneration potential can be used to a high degree.

According to a third aspect there is provided an electric vehicle including a data processing system according to the present disclosure. In such an electric vehicle, the potential for energy regeneration can be used to a high degree. Consequently, it has a comparatively long electric driving range.

According to a fourth aspect there is provided a computer program product including instructions which, when the program is executed by a computer, cause the computer to carry out the method according to the present disclosure. The computer is for example the data processing system according to the third aspect.

According to a fifth aspect there is provided a computer-readable medium including instructions which, when executed by a computer, cause the computer to carry out the method according to the present disclosure. Again, the computer is for example the data processing system according to the third aspect. The instructions are for example included by the computer program product according to the fourth aspect.

It should be noted that the above examples may be combined with each other irrespective of the aspect involved. Accordingly, the method may be combined with structural features and, likewise, the data processing system and the electric vehicle may be combined with features described above with regard to the method.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
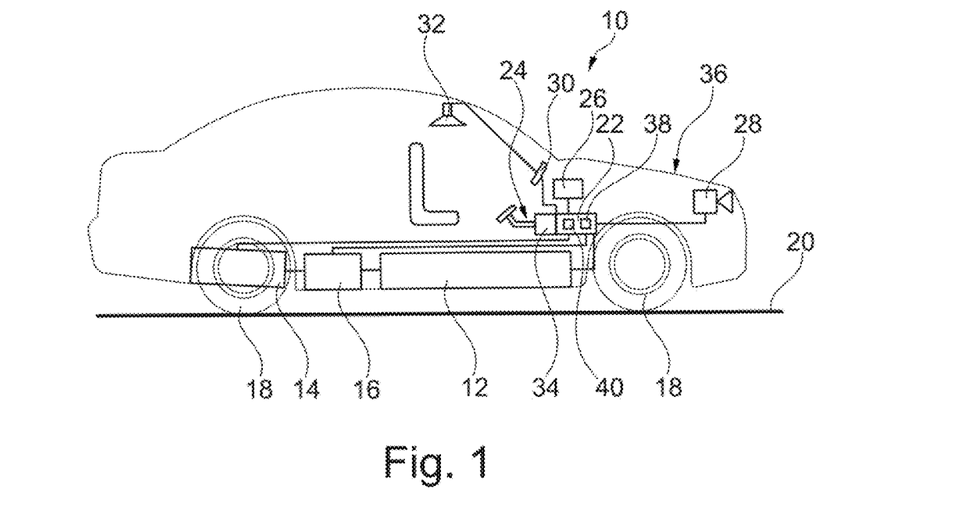
FIG. 1 shows an electric vehicle according to the present disclosure having a data processing system according to the present disclosure, a computer program product according to the present disclosure and a computer readable medium according to the present disclosure, all being configured for carrying out a method according to the present disclosure.

FIG. 1 shows an electric vehicle 10 having a traction battery 12, an electric traction machine 14 and an inverter unit 16. The electric traction machine 14 is electrically coupled to the traction battery 12 via the inverter unit 16. The electric traction machine 14 is mechanically coupled to at least two wheels 18 of the electric vehicle 10 in order to provide a propulsion torque being applied on a road 20 via the wheels 18.

The electric vehicle 10 further includes a control unit 22 being communicatively coupled with the electric traction machine 14, the traction battery 12 and the inverter unit 16. Moreover, the control unit 22 is communicatively coupled to a drive pedal 24. It is noted that the electric vehicle 10 also includes a brake pedal. However since it is not essential for the present disclosure it is not represented.

The electric vehicle 10 is further equipped with a navigation system 26 and a visual inspection unit 28. The navigation system 26 and the visual inspection unit 28 are also communicatively coupled to the control unit 22. It is noted that the electric vehicle 10 may alternatively just be equipped with one out of the navigation system 26 and the visual inspection unit 28. This is sufficient for practicing the elements of the present disclosure.

Additionally, the electric vehicle 10 includes a first signal generation means 30 which is an optic signal generation means, a second signal generation means 32 which is an acoustic signal generation means and a third signal generation means 34 which is a haptic signal generation means. All signal generation means 30, 32, 34 are communicatively coupled to the control unit 22. It is noted that the electric vehicle 10 does not necessarily need to include all three signal generation means 30, 32, 34. It is also possible that the vehicle only includes one out of the three signal generation means 30, 32, 34 or any two out of the three signal generation means 30, 32, 34. The control unit 22 and the signal generation means 30, 32, 34 together form a data processing system 36. In this context, the control unit 22 includes data processing means 38 being configured for carrying out a method for operating an electric vehicle. The data processing means 38 may be used for running a computer program product including instructions which, when being executed by the data processing means 38, cause the control unit 22 to carry out the method. Moreover, the control unit 22 includes a computer-readable medium 40 which can also be called a storage unit including these instructions.

Figure 2:
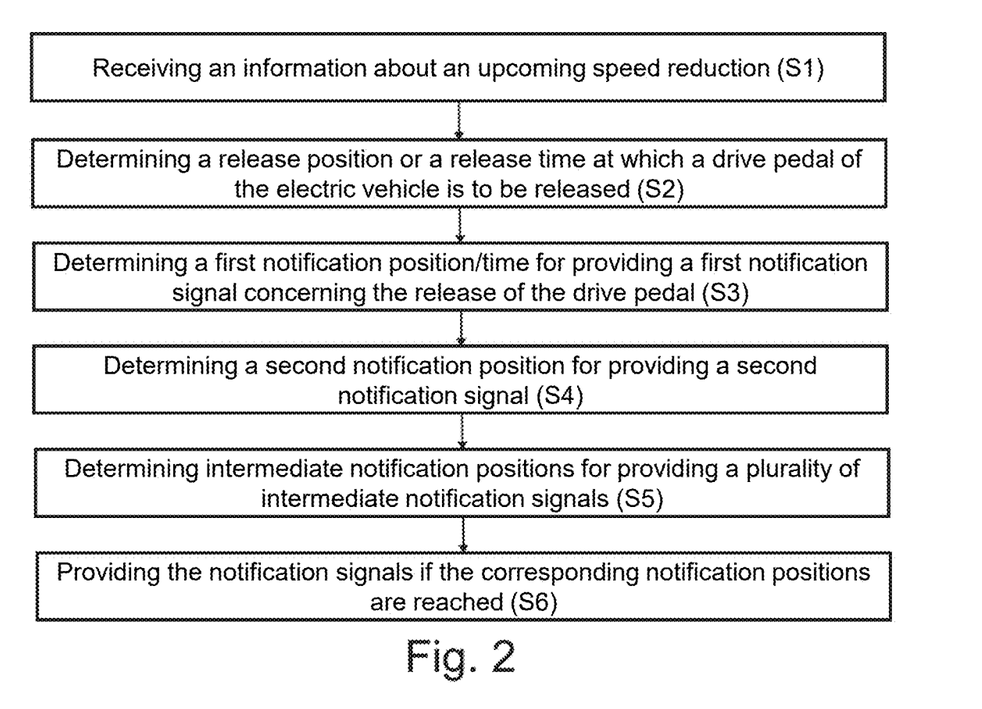
FIG. 2 illustrates steps of the method according to the present disclosure.

The method for operating an electric vehicle will be explained in the following with reference to FIG. 2 and FIG. 3.

In a first step S1, an information about an upcoming speed reduction is received. In a purely illustrative example, the upcoming speed reduction concerns a lower speed limit zone, i.e. an upcoming portion of the route being travelled by the electric vehicle 10 having a lower speed limit. The upcoming speed reduction is described by a speed objective parameter corresponding to the speed limit and a position parameter, describing the position at which the lower speed limit zone starts.

In the present example, the information about the upcoming speed reduction may be received from a map available in the electric vehicle 10 as a part of the navigation system 26. In this map, a speed limit is attributed to each road segment. It is noted that a changing speed limit only is considered to be an upcoming speed reduction if a current speed of the electric vehicle 10 is higher than the upcoming speed limit, i.e. the speed objective parameter describing the upcoming speed reduction.

Alternatively or additionally, the information about the upcoming speed reduction may be received from the visual inspection unit 28 of the electric vehicle. In the present example, the visual inspection unit 28 includes a camera and is configured for performing a road sign detection. Thus, a road sign relating to an upcoming speed reduction can be detected and a corresponding position parameter can be generated.

In a case in which the electric vehicle 10 includes both a navigation system 26 and a visual inspection unit 28 being configured for performing a road sign detection, the information about the upcoming speed reduction being received from both entities may be compared. If the upcoming speed reductions differ in the corresponding position parameter and/or the corresponding speed objective parameter, the method may use the more limiting one of these parameters.

Thereafter, in a second step S2, a release position PR is generated. The release position PR is a position at which the drive pedal 24 is to be released, such that at the position being described by the position parameter the electric vehicle 10 travels at a speed corresponding to the speed objective parameter. The release position PR is determined by using a vehicle-specific deceleration function which is stored on the computer-readable medium 40. When a current speed of the electric vehicle 10 is input into the deceleration function, it outputs a travel distance which the electric vehicle will be able to cover if the drive pedal 24 is released. Based on the release position PR, in a third step S3, a first notification position P1 for providing a first notification signal N1 is generated. The first notification position P1 is determined such that a difference between the first notification position P1 and the release position PR is bigger than a travel distance of the electric vehicle 10 corresponding to a driver reaction time TDR, i.e. bigger than a distance that the electric vehicle travels during a reaction time of the driver.

Moreover, in a fourth step S4, a second notification position P2 is determined for providing a second notification signal N2. The second notification position P2 is determined such that a difference between the second notification position P2 and the release position PR equals a travel distance of the vehicle corresponding to a driver reaction time. This means, if at the second notification position P2 the driver is informed to release the drive pedal 24 he would release the drive pedal at the release position PR.

In a fifth step S5, several intermediate notification positions Pi are determined for providing a plurality of intermediate notification signals Ni. All intermediate notification positions Pi are located between the first notification position P1 and the second notification position P2.

Subsequently, in a sixth step S6, the first notification signal N1 is provided if the first notification position P1 is reached, the second notification signal N2 is provided if the second notification position P2 is reached, and the intermediate notification signals Ni are provided if the corresponding intermediate notification positions Pi are reached.

Figure 3:
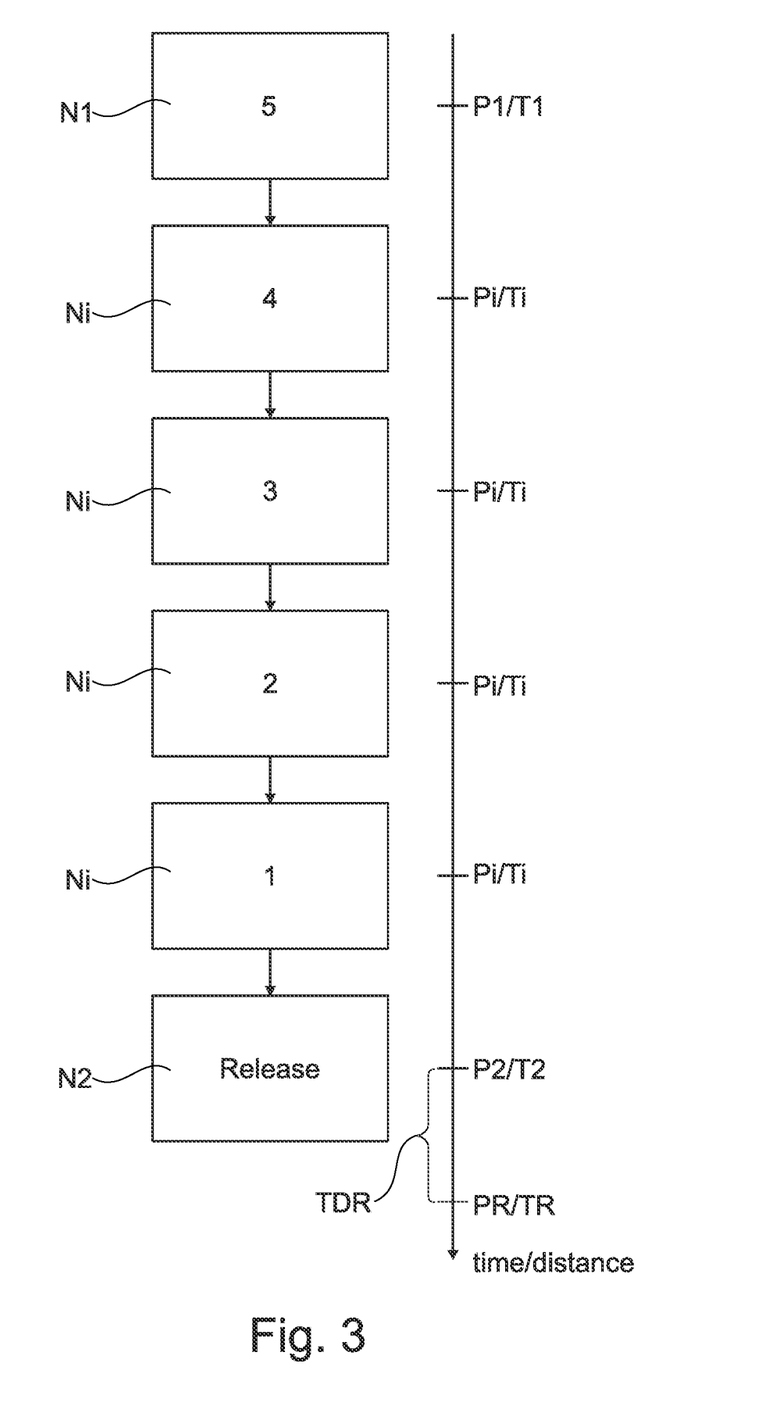
FIG. 3 illustrates a visual notification signals forming a countdown signal pattern.

In the example illustrated in FIG. 3, all notification signals N1, N2, Ni are visual signals and the first notification signal N1, the second notification signal N2 and the intermediate notification signals Ni are provided to the driver via a screen provided in the electric vehicle 10 as a part of the first signal generation means 30. Furthermore, in the example shown in FIG. 3, the notification signals N1, N2, Ni form a countdown signal pattern as is illustrated in the sequence of screenshots shown in FIG. 3. In this context, the screenshot showing "5" represents the first notification signal N1. The screenshot showing "release" represents the second notification signal N2 and the screenshots showing "4", "3", "2", and "1" represent intermediate notification signals Ni respectively.

Figure 4:
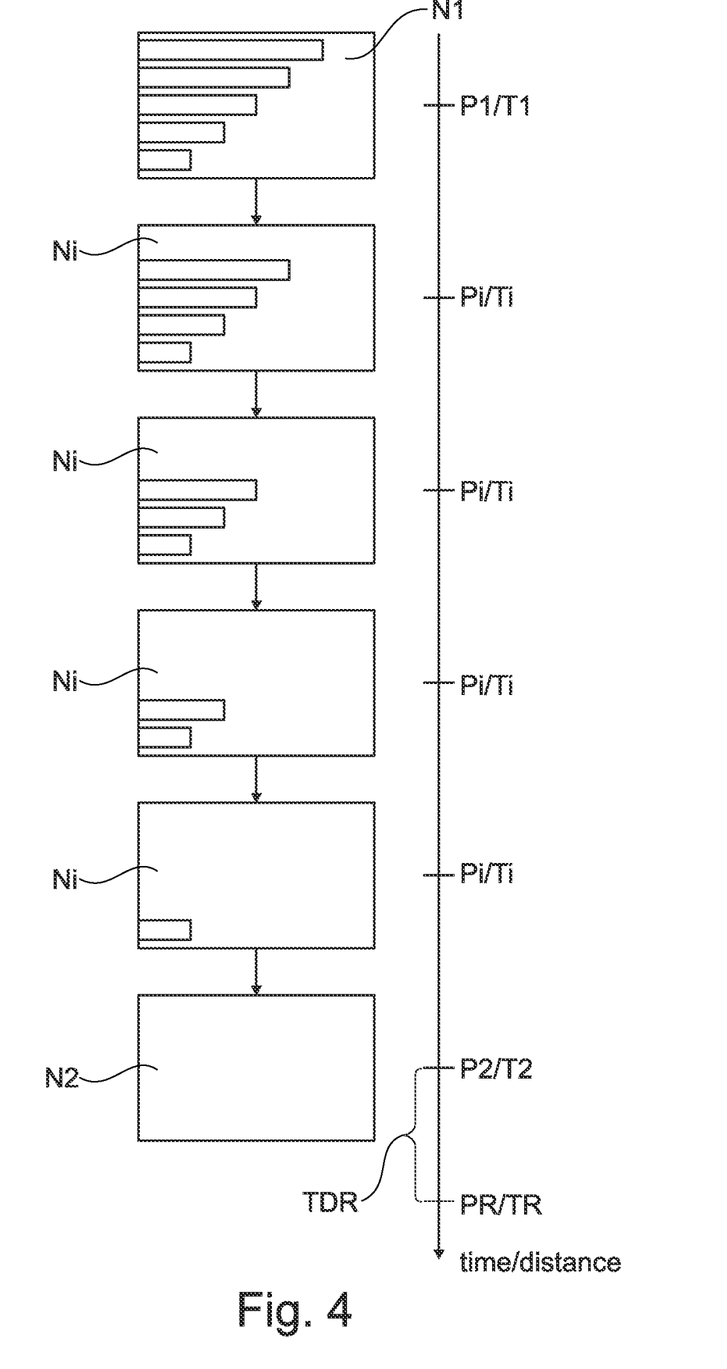
FIG. 4 illustrates other visual notification signals forming a countdown signal pattern.

FIG. 4 shows another example wherein all notification signals N1, N2, Ni are visual signals being represented as a sequence of screenshots. Again, the first notification signal N1, the second notification signal N2, and the intermediate notification signals Ni are provided to the driver via a screen provided in the electric vehicle 10 as a part of the first signal generation means 30. In this example, the screenshot showing five horizontal bars represents the first visual notification signal N1. The screenshot not showing any bar represents the second notification signal N2. The screenshots showing four, three, two and one bar respectively represent intermediate notification signals Ni. Also in this example, the visual notification signals N1, N2, Ni form a countdown signal pattern as can be seen from the sequence of screenshots shown in FIG. 4.

Figure 5:
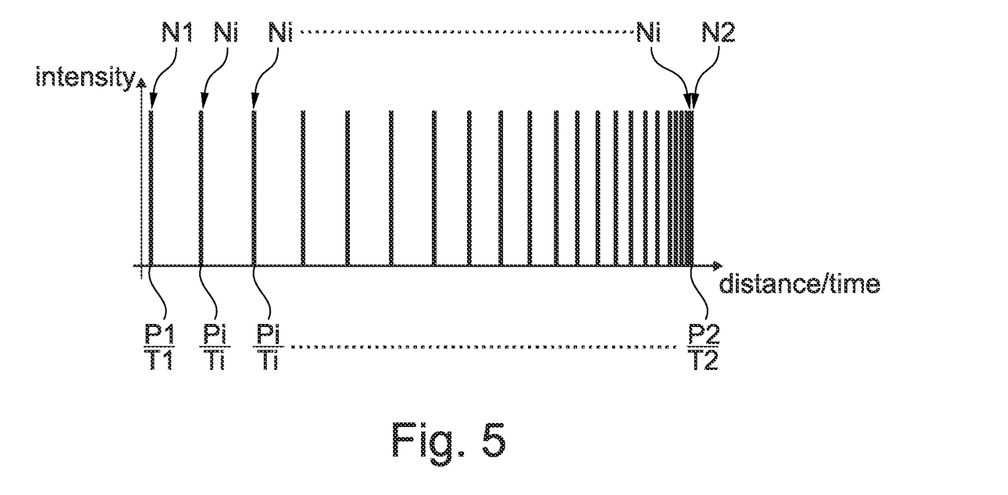
FIG. 5 illustrates acoustic or haptic notification signals forming a countdown signal pattern.

FIG. 5 shows a further example wherein the notification signals N1, N2, Ni are represented as vertical bars. In this example, the notification signals N1, N2, Ni are acoustic or haptic. In the first case, each of the vertical bars represents a beep sound of a predefined intensity (cf. vertical axis). As can be seen from the diagram of FIG. 5, the beep sounds are distributed over a distance (cf. horizontal axis). The beep sounds can be provided to the driver by the second signal generation means 32. The beep sound being represented by the leftmost bar represents the first notification signal N1 which is produced at the first notification position P1. The beep sound being represented by the rightmost bar represents the second notification signal N2 which is produced at the second notification positon. The beep sounds being represented by the bars between the leftmost bar and the rightmost bar represent intermediate notification signals Ni being produced at respective intermediate notification positions Pi.

Also in the example of FIG. 5, the notification signals N1, N2, Ni form a countdown signal pattern since the distance between neighboring notification signals reduces towards the second notification position P2. Thus, when approaching the second notification position P2, a driver will perceive an increased number of beep sounds per time unit, e.g. per second or per minute.

As has already mentioned before, the vertical bars shown in FIG. 5 can also represent a haptic signal. In this variant, each vertical bar represents a vibration pulse of a predefined intensity. For the remaining aspects, reference is made to the explanations in connection with the acoustic notification signals.

Figure 6:
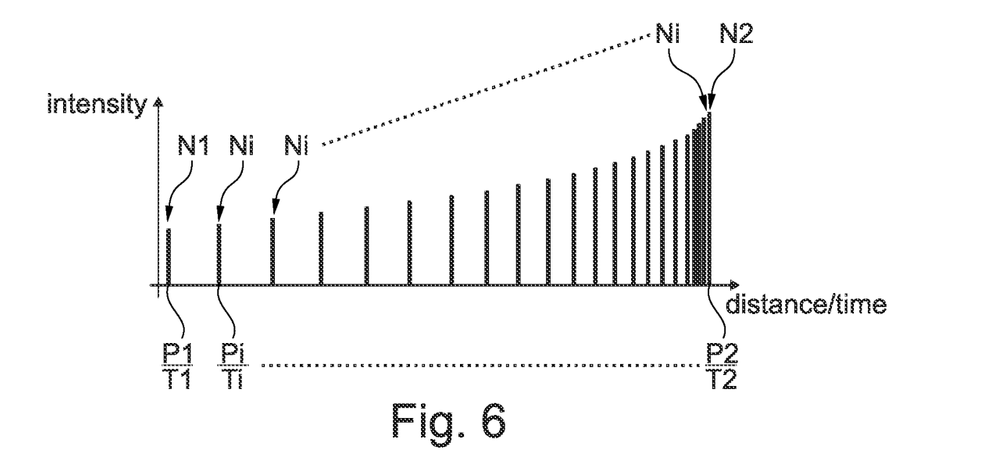
FIG. 6 illustrates other acoustic or haptic notification signals forming a countdown signal pattern.

A further variant is shown in FIG. 6. Also in this example, acoustic or haptic notification signals N1, N2, Ni are represented by vertical bars. The leftmost vertical bar again represents the first notification signal N1 and the rightmost bar again represents a second notification signal N2. The vertical bars in between represent intermediate notification signals Ni. As before, the notification signals N1, N2, Ni form a countdown signal pattern. However, in addition to the reducing distance between neighboring notification signals, an intensity of the notification signals increases starting from a first level of intensity at the first notification signal N1 towards a second, higher level of intensity at the second notification signal N2. If the notification signals N1, N2, Ni are acoustic notification signals, the intensity may correspond to a sound level, thus, an increased intensity means that the signal is louder. If the notification signals N, N2, Ni are haptic notification signals, an amplitude of a corresponding vibration pulse or a force for generating such a vibration pulse is increased.

Beyond that reference is made to the example of FIG. 5.

The above examples have been explained with reference to a first notification position P1, a second notification position P2, a release position PR and intermediate notification positions Pi. It is understood that the above examples could as well be realized by using a first notification time T1, a second notification time T2, a release time TR and an intermediate notification time Ti. The above explanations are also valid for this case.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A method for operating an electric vehicle, comprising:
receiving an information about an upcoming speed reduction during operation of the electric vehicle, the upcoming speed reduction being described by a speed objective parameter and a position parameter, and
determining, by a control unit coupled to a drive pedal of the electric vehicle, a release position (PR) or a release time (TR) at which the drive pedal of the electric vehicle is to be released, based on a vehicle-specific deceleration function stored in the control unit using a current speed as an input parameter and/or based on a look-up table stored in the control unit showing a vehicle-specific deceleration as a function of current speed, such that at a position being described by the position parameter, the electric vehicle travels at a speed corresponding to the speed objective parameter, and one or more of:
determining, by the control unit, a first notification position (P1) for providing a first notification signal (N1) by a signal generation means comprising one or more of an optic output device, an acoustic output device, or a haptic output device coupled to and controlled by the control unit, the first notification signal (N1) indicating the release of the drive pedal, and a difference between the first notification position (P1) and the release position (PR) being greater than a travel distance of the electric vehicle corresponding to a driver reaction time (TDR), such that a driver of the electric vehicle is informed by an optical, audio, or haptic signal from the signal generation means that the drive pedal is to be released and that the electric vehicle decelerates as a consequence thereof, and
determining, by the control unit, a first notification time (T1) for providing a first notification signal (N1) by the signal generation means, the first notification signal (N1) indicating the release of the drive pedal, and a difference between the first notification time (T1) and the release time (TR) being greater than a driver reaction time (TDR), such that the driver of the electric vehicle is informed by the optical, audio, or haptic signal from the signal generation means that the drive pedal is to be released and that the electric vehicle decelerates as a consequence thereof.

2. The method according to claim 1, further comprising one or more of:
  determining, by the control unit, a second notification position (P2) for providing a second notification signal (N2) by the signal generation means, the second notification signal (N2) indicating the release of the drive pedal, and a difference between the second notification position (P2) and the release position (PR) equaling a travel distance of the electric vehicle corresponding to a driver reaction time (TDR); and
  determining, by the control unit, a second notification time (T2) for providing a second notification signal (N2) by the signal generation means, the second notification signal (N2) indicating the release of the drive pedal, and a difference between the second notification time (T2) and the release time (TR) equaling a driver reaction time (TDR).

3. The method according to claim 2, further comprising one or more of:
  determining, by the control unit, an intermediate notification position (Pi) for providing an intermediate notification signal (Ni) by the signal generation means, the intermediate notification signal (Ni) indicating the release of the drive pedal, and the intermediate notification position (Pi) being located between the first notification position (P1) and the second notification position (P2); and
  determining, by the control unit, an intermediate notification time (Ti) for providing an intermediate notification signal (Ni) by the signal generation means, the intermediate notification signal (Ni) indicating the release of the drive pedal, and the intermediate notification time (Ti) lying between the first notification time (T1) and the second notification time (T2).

4. The method according to claim 3, further comprising one or more of:
  providing the first notification signal (N1) by the signal generation means at the direction of the control unit if the first notification position (P1) and/or the first notification time (T1) is reached;
  providing the second notification signal (N2) by the signal generation means at the direction of the control unit if the second notification position (P2) and/or the second notification time (T2) is reached;
  providing the intermediate notification signal (Ni) by the signal generation means at the direction of the control unit if the intermediate notification position (Pi) and/or the intermediate notification time (Ti) is reached.

5. The method according to claim 4, wherein the first notification signal (N1), the intermediate notification signal (Ni) and the second notification signal (N2) form a countdown signal pattern.

6. The method according to claim 4, wherein at least one of the first notification signal (N1), the second notification signal (N2) and the intermediate notification signal (Ni) is at least one of an acoustic signal, a visual signal, and a haptic signal.

7. The method according to claim 4, further comprising:
  providing at least one of the first notification signal (N1), the second notification signal (N2) and the intermediate notification signal (Ni) to the driver of the electric vehicle by the signal generation means at the direction of the control unit.

8. The method according to claim 1, further comprising:
  receiving the information about the upcoming speed reduction from a map available in the electric vehicle.

9. The method according to claim 1, further comprising:
  receiving the information about the upcoming speed reduction from a visual inspection unit of the electric vehicle.

10. A data processing system comprising a processor operable for carrying out instructions stored in a memory for carrying out the method of claim 3.

11. The data processing system according to claim 10, further comprising the signal generation means being configured for providing at least one of the first notification signal (N1), the second notification signal (N2), and the intermediate notification signal (Ni), the first notification signal (N1), the second notification signal (N2), and the intermediate notification signal (Ni) being at least one of an acoustic signal, a visual signal, and a haptic signal.

12. An electric vehicle comprising the data processing system according to claim 10.

13. A non-transitory computer-readable medium comprising instructions stored in a memory and executed by a processor to carry out steps for operating an electric vehicle, comprising:
  receiving an information about an upcoming speed reduction during operation of the electric vehicle, the upcoming speed reduction being described by a speed objective parameter and a position parameter, and
  determining, by a control unit coupled to a drive pedal of the electric vehicle, a release position (PR) or a release time (TR) at which the drive pedal of the electric vehicle is to be released, based on a vehicle-specific deceleration function stored in the control unit using a current speed as an input parameter and/or based on a look-up table stored in the control unit showing a vehicle-specific deceleration as a function of current speed, such that at a position being described by the position parameter, the electric vehicle travels at a speed corresponding to the speed objective parameter, and one or more of:
  determining, by the control unit, a first notification position (P1) for providing a first notification signal (N1) by a signal generation means comprising one or more of an optic output device, an acoustic output device, or a haptic output device coupled to and controlled by the control unit, the first notification signal (N1) indicating the release of the drive pedal, and a difference between the first notification position (P1) and the release position (PR) being greater than a travel distance of the electric vehicle corresponding to a driver reaction time (TDR), such that a driver of the electric vehicle is informed by an optical, audio, or haptic signal from the signal generation means that the drive pedal is to be released and that the electric vehicle decelerates as a consequence thereof, and
  determining, by the control unit, a first notification time (T1) for providing a first notification signal (N1) by the signal generation means, the first notification signal (N1) indicating the release of the drive pedal, and a difference between the first notification time (T1) and the release time (TR) being greater than a driver reaction time (TDR), such that the driver of the electric vehicle is informed by the optical, audio, or haptic signal from the signal generation means that the drive pedal is to be released and that the electric vehicle decelerates as a consequence thereof.

* * * * *